(No Model.)

E. L. HOWE.
SNAP HOOK.

No. 382,611. Patented May 8, 1888.

WITNESSES.
N. S. Armstutz
Geo. W. King

Eugene L. Howe, INVENTOR.
By Liggett & Liggett, Attorney.

UNITED STATES PATENT OFFICE.

EUGENE L. HOWE, OF CLEVELAND, OHIO.

SNAP-HOOK.

SPECIFICATION forming part of Letters Patent No. 382,611, dated May 8, 1888.

Application filed December 27, 1887. Serial No. 259,028. (No model.)

*To all whom it may concern:*

Be it known that I, EUGENE L. HOWE, of Cleveland, in the county of Cuyahoga and State of Ohio, have invented certain new and useful Improvements in Snap-Hooks; and I do hereby declare the following to be a full, clear, and exact description of the invention, such as will enable others skilled in the art to which it pertains to make and use the same.

My invention relates to improvements in snap-hooks designed more especially for fastening harness breast-straps, although well adapted to various purposes, in which two hooks in reverse position are separated far enough to admit a ring, staple, or other similar device between them, these hooks being integral with a shank, in common with a spring-actuated push-bar connected with such shank and serving as a mousing for the hooks, to the end that a strong, convenient, and safe device is had for the purpose aforesaid.

With these objects in view my invention consists in certain features of construction and in combination of parts hereinafter described, and pointed out in the claim.

Figure 1:
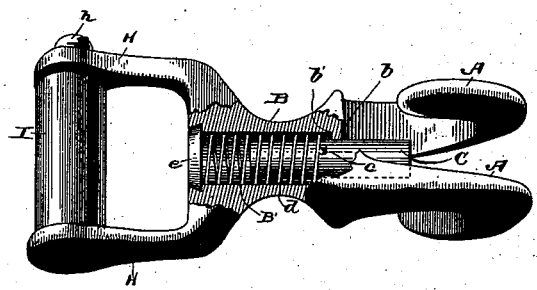
Figure 2:
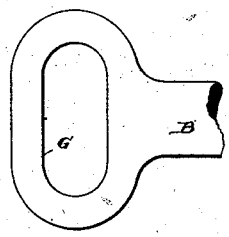

In the accompanying drawings, Figure 1 is a view in perspective, a portion of the shank being broken away to show the internal construction. Fig. 2 is a modification hereinafter described.

A A represent hooks arranged in the reverse order, (shown in Fig. 1,) these hooks being integral with shank B. The hooks are separated far enough to admit a ring or other similar article between them. The shank B is provided with chamber B' and a hole, $b$, leading from the chamber toward the hooks, the hole being somewhat less in diameter than the chamber, so as to leave an internal ledge or shoulder, $b'$. Push-bar C fits hole $b$, and has a laterally-projecting pin, $c$, for engaging shoulder $b'$, to limit the outward movement of the push-bar. A spiral spring, $d$, is coiled around bar C and abuts pin $c$, the tension of this spring tending to thrust bar C outward or toward the hooks, this bar serving as a mousing for the hooks. There is usually an opening at the rear end of the shank for assembling the parts, such opening being closed by plate $e$, this plate having beveled edges over which the metal of the shank is slightly flanged or riveted to hold plate $e$ in place. When the work is finished, the plate $e$ is not noticeable.

The snap-hook may be provided with a loop, G, as shown in Fig. 2, or ears H may be provided with pintle $h$, on which roller I is mounted, either form of loop being well known.

In operating the device the ring, staple, or whatever the snap-hook is to be fastened to, is entered between the hooks, pushing back the push-bar until the hooks can be given a quarter-turn to hook both hooks over such ring or staple. The recoil of spring $d$ thrusts the push-bar forward past the ends of the hooks and prevents the latter from unhooking. In unhooking the device, from the fact that the push-bar must be thrust back and held in such position while the hooks are given a quarter-turn to free them from the ring or staple, it is evident that the device is not liable to be accidentally unfastened.

What I claim is—

In a snap-hook, the combination, with reverse rigid hooks integral with a shank, of a spring-actuated push-bar connected with such shank and serving as a mousing for the hooks, substantially as set forth.

In testimony whereof I sign this specification, in the presence of two witnesses, this 1st day of November, 1887.

EUGENE L. HOWE.

Witnesses:
  WM. AUSTIN,
  F. M. LYON.